United States Patent [19]

[11] 4,009,387

Nuver

[45] Feb. 22, 1977

[54] AUTOMATIC ENERGY CONTROL LIGHTING SYSTEM WITH AUTOMATICALLY VARIABLE DC SOURCE

[75] Inventor: Eric L. H. Nuver, Houston, Tex.

[73] Assignee: Esquire, Inc., New York, N.Y.

[22] Filed: July 19, 1976

[21] Appl. No.: 706,567

Related U.S. Application Data

[63] Continuation of Ser. No. 581,270, May 27, 1975, abandoned.

[52] U.S. Cl. ................................ 250/205; 315/151; 315/144; 315/158

[51] Int. Cl.$^2$ ...................... G01J 1/32; H05B 41/36

[58] Field of Search .............. 250/205, 214 D, 207; 315/150, 151, 158, 144

[56] References Cited

UNITED STATES PATENTS

| | | | |
|---|---|---|---|
| 3,558,892 | 1/1971 | Seeley | 250/205 |
| 3,599,037 | 8/1971 | Grace | 315/158 |
| 3,609,451 | 9/1971 | Edgerly, Jr. | 315/151 |
| 3,681,654 | 8/1972 | Quinn | 315/151 |
| 3,894,265 | 7/1975 | Holmes et al. | 315/144 |

OTHER PUBLICATIONS

Prot: IBM Technical Disclosure Bulletin, vol. 7, No. 9, 2/65, p. 841.

*Primary Examiner*—Alfred E. Smith
*Assistant Examiner*—David K. Moore
*Attorney, Agent, or Firm*—Arnold, White & Durkee

[57] ABSTRACT

An automatically variable d.c. voltage source supplies a control signal to a dimmer circuit that controls the brightness of a high intensity gas discharge lamp in response to a varying d.c. voltage. The automatically variable d.c. voltage source produces a varying d.c. voltage at its output which is functionally related to the difference between a voltage from a stable reference voltage source and a voltage produced by a photocell circuit which is responsive to the light level of an area illuminated by the lamp controlled by the dimmer circuit. The variable d.c. source includes circuitry for indicating relamping conditions.

22 Claims, 14 Drawing Figures

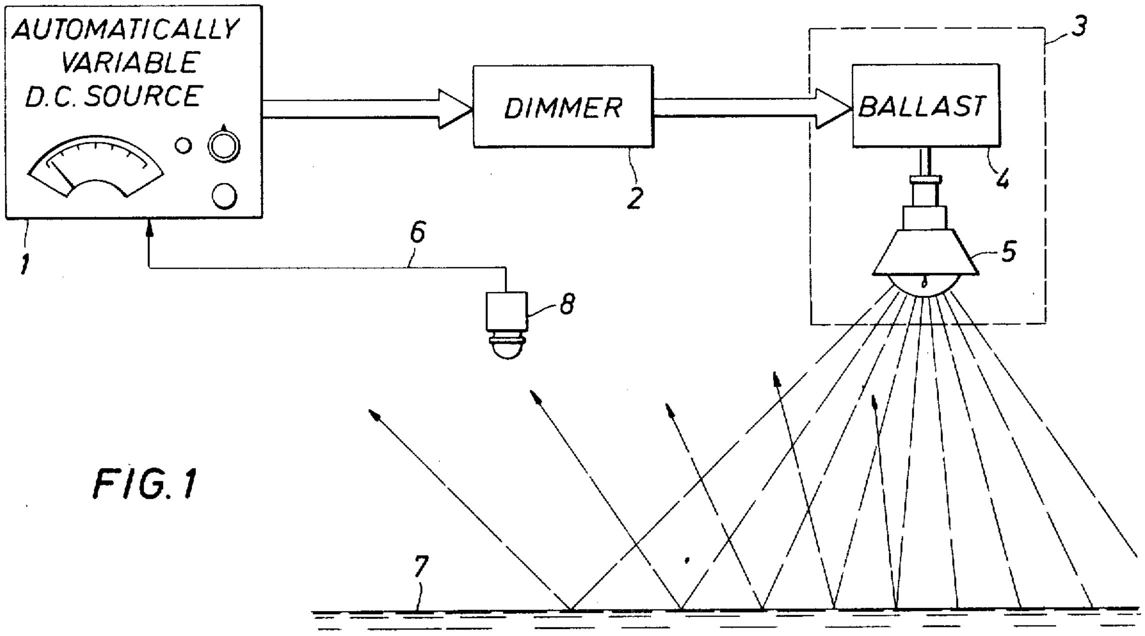
FIG. 1
FIG. 2
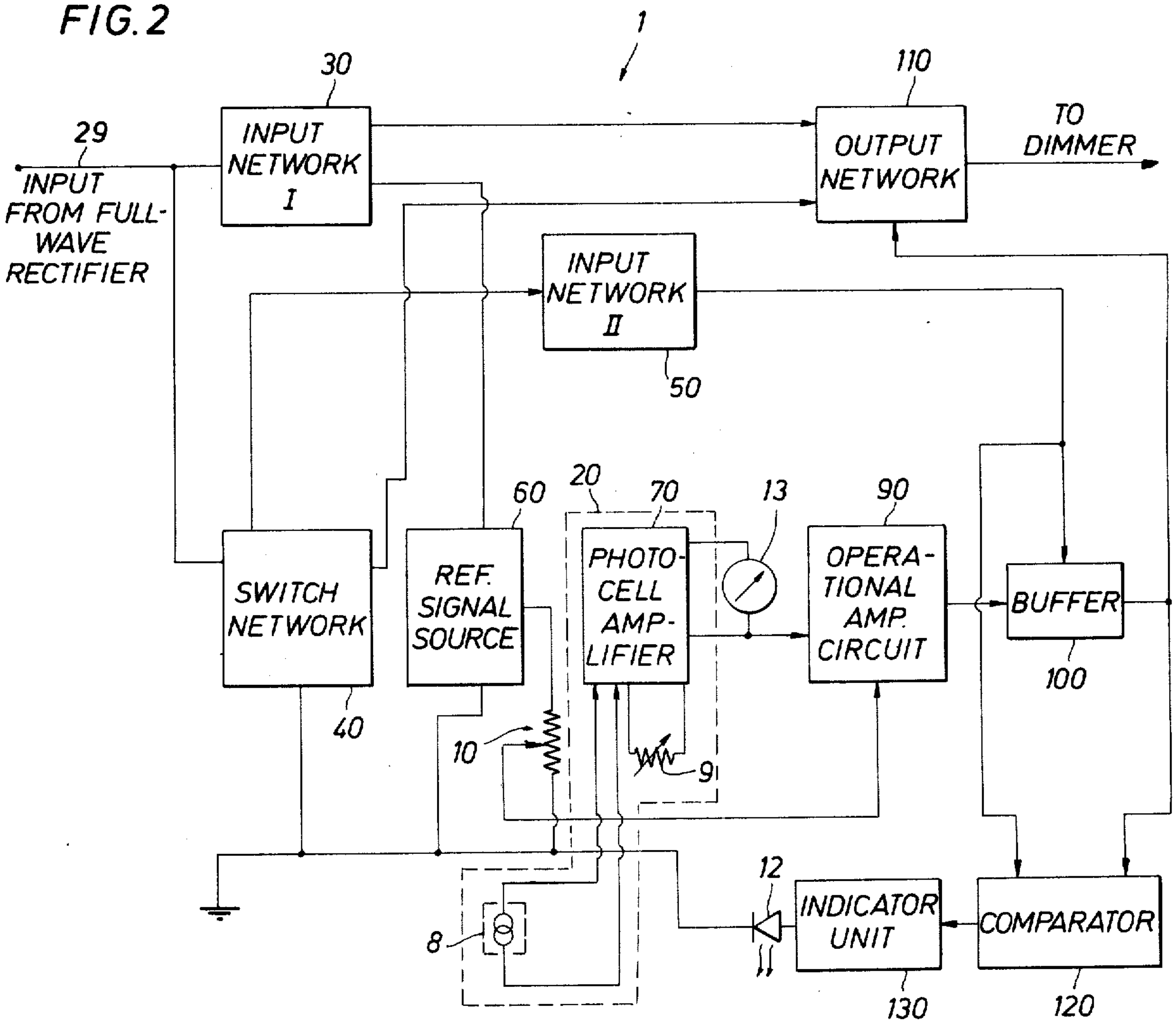

FIG. 3
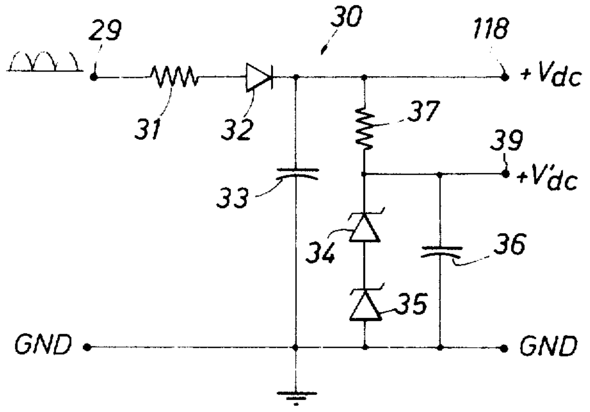
FIG. 4
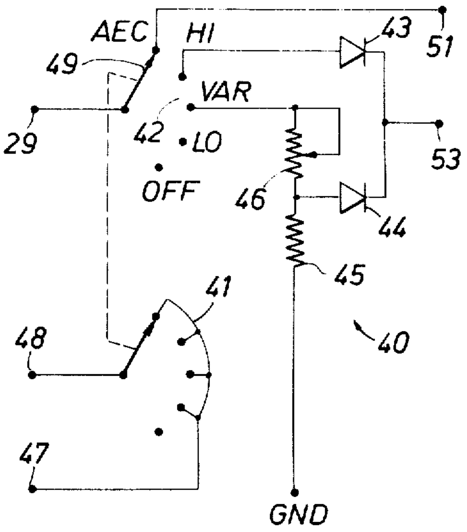
FIG. 5
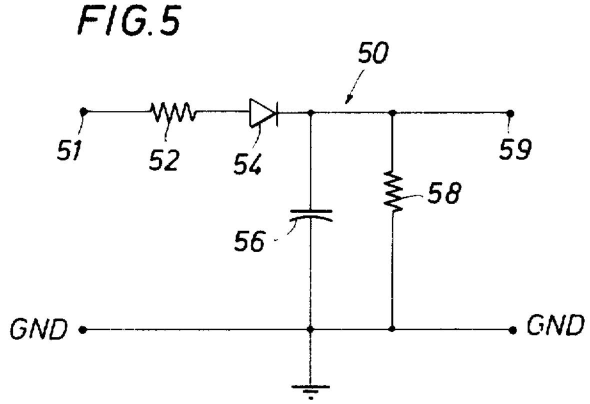
FIG. 6
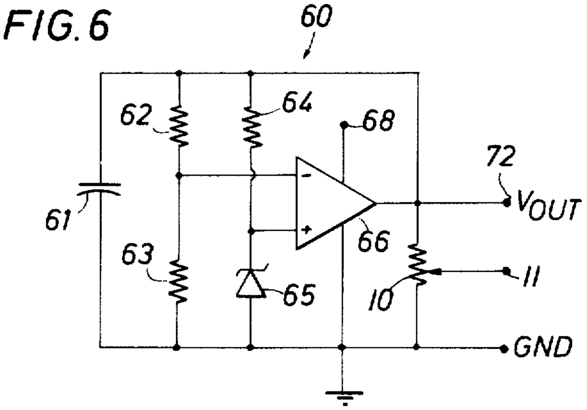
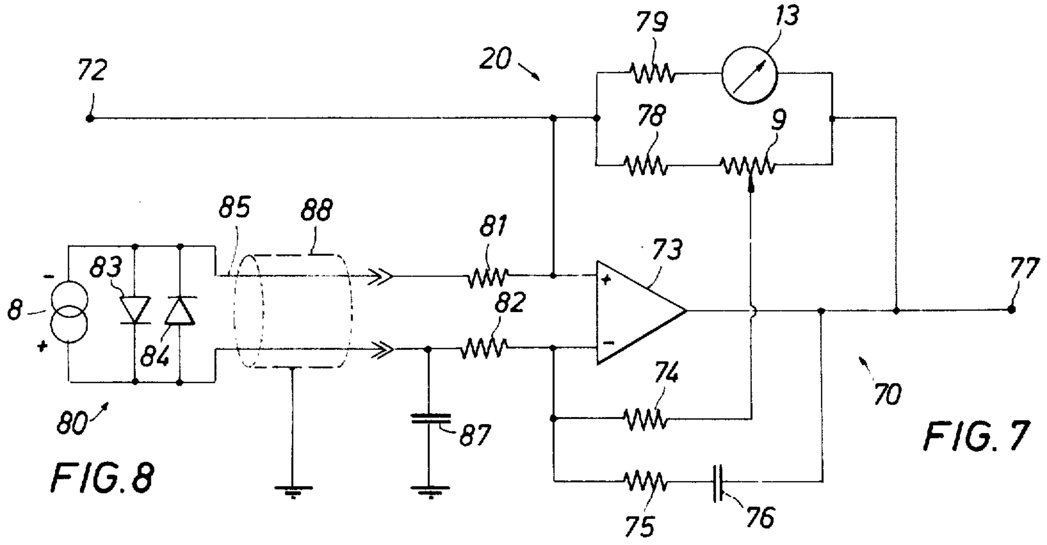
FIG. 7
FIG. 8

FIG. 9
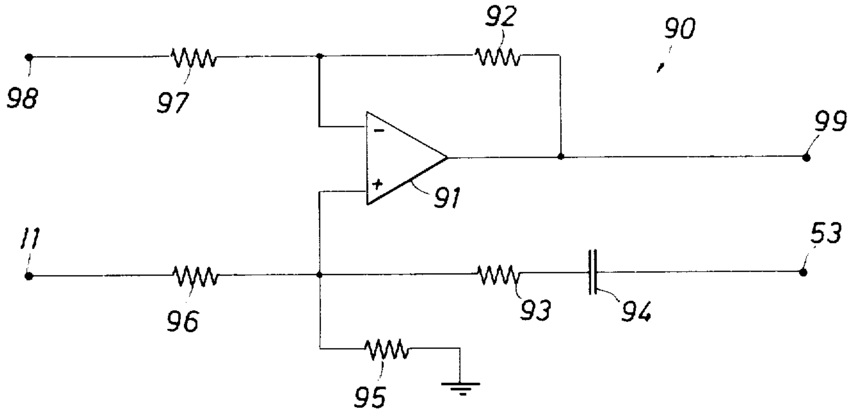
FIG. 10
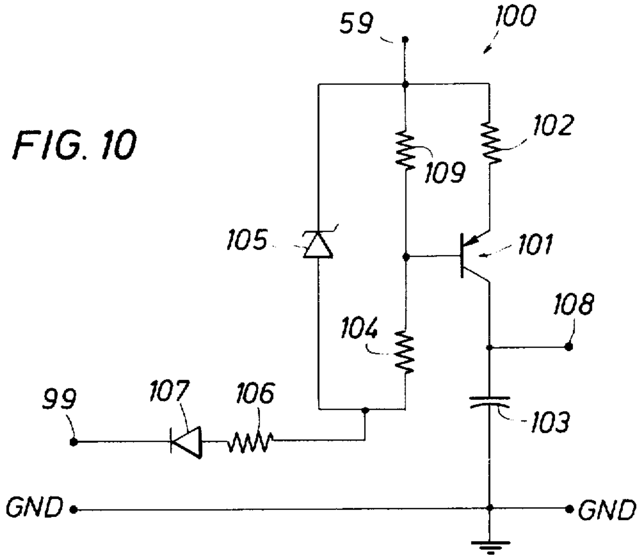
FIG. 11
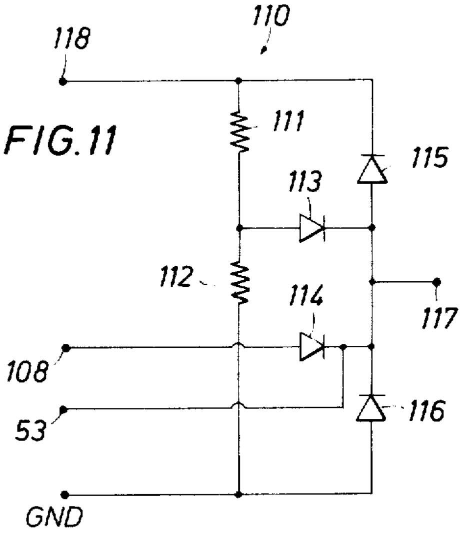
FIG. 12
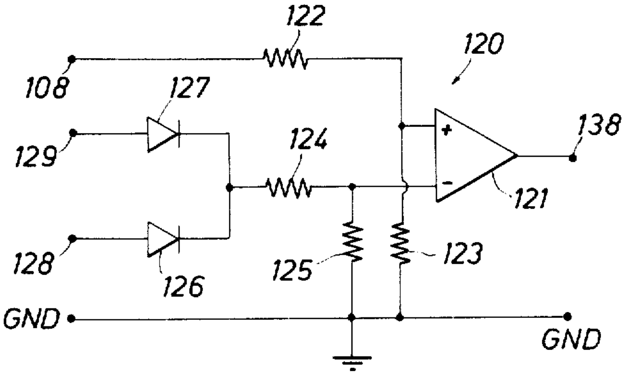
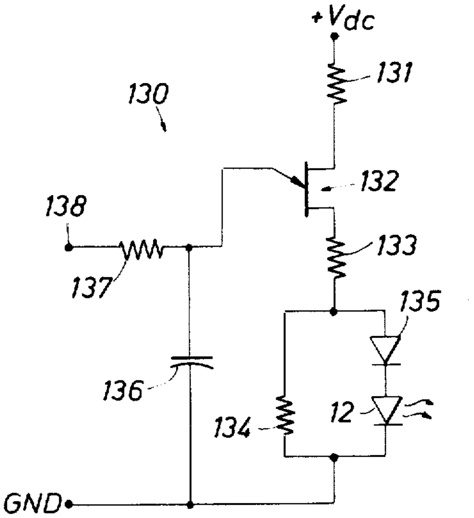
FIG. 13

AUTOMATIC ENERGY CONTROL LIGHTING SYSTEM WITH AUTOMATICALLY VARIABLE DC SOURCE

This is a continuation of application, Ser. No. 581,270, filed May 27, 1975 and now abandoned.

BACKGROUND OF THE INVENTION

This invention relates to lighting systems, and more particularly, to a lighting system having a lamp dimmer which is controlled in response to changes in illumination over an area.

Conventional interior and outdoor lighting design has been approached from the standpoint of providing uniform illumination over an area. Typically, lighting systems have been designed to provide a recommended minimum level of illumination for a given area depending upon the activity contemplated for that area. The calculations made in designing conventional lighting systems take into consideration light-loss factors through the use of a so-called "maintenance factor." The maintenance factor accounts only for lamp lumen depreciation and luminaire dirt depreciation. The effect of the approach to lighting design of establishing a level of illumination over a specified area of some stated minimum maintained footcandles is that the systems initially produce considerably more footcandles than are really required.

In recent years, a new approach in lighting system design has emerged. Lighting designers are now designing in terms of uniform illumination relative to time as well as relative to space. This shift in design approach is largely due to the advances made in controlling the lumen output of high intensity discharge (HID) lamps. The approach of establishing uniform illumination relative to time has been implemented through the use of dimmer circuits. Dimming of HID lamps makes practical such concepts as preprogramed light levels to match area activities, controlled dimming when lighting is augmented by daylight to match the sunlight contribution and individual task-lighting control.

Another concept of dimming that is growing in significance as energy conservation becomes increasingly important involves automatic energy control for constant illumination. As pointed out previously with respect to conventional lighting design approaches, an illumination system designed with the capability of more footcandles than initially required in order to make up for lamp lumen depreciation, dirt effects and other light-loss factors will initially provide more light and use more power than actually required. With automatic energy control, illumination can be reduced initially to the specified minimum maintained level, then slowly adjusted up during the time of use as the various light-loss factors develop until 100% lamp output is reached at relamping. Automatic energy control, however, requires an effective power control circuit for lamp dimming and an accurate, reliable means for adjusting the power control circuit.

Only recently, however, have lighting system components for effectively dimming HID lamps been developed. A HID lamp dimmer is revealed in U.S. Pat. No. 3,894,265, filed Feb. 11, 1974 and entitled "High Intensity Lamp Dimming Circuit", assigned to the same assignee as the present application and hereby incorporated by reference. Although an effective dimmer circuit has been developed, the realization of automatic energy control has not come into being for lack of development of an accurate and reliable automatically variable d.c. voltage source for controlling such a HID lamp dimmer circuit.

SUMMARY OF THE INVENTION

It is therefore a feature of this invention to provide an accurate and reliable design for an automatically variable d.c. voltage source to be used to control a HID lamp dimmer circuit.

There is provided by the present invention an automatically variable d.c. voltage source which, when combined with a dimmer circuit, provides automatic energy control lighting.

There is further provided by the present invention an automatically variable d.c. voltage source which outputs a variable d.c. voltage in response to a change in illumination over an area.

There is yet further provided by the present invention an automatically variable d.c. voltage source which gives an indication when a relamp condition exists requiring lamp change or maintenance.

There is provided by the present invention a variable d.c. voltage source which, in combination with a HID lamp dimmer circuit, controls lamp lumen output to maintain a constant illumination level from initial installation until relamping thereby saving energy.

It is a further feature of the present invention to provide a relative light level indication for an area.

An automatically variable d.c. voltage source for controlling a HID lamp dimmer circuit to provide automatic energy control operation in accordance with this invention includes a photocell circuit for generating a signal in response to the illumination level over an area.

A stable reference signal source produces a reference signal, which source is electrically coupled to a differential amplifier circuit along with the photocell circuit.

The differential amplifier circuit produces a variable d.c. voltage functionally related to the difference in amplitude between the signal from the reference signal source and the signal from the photocell circuit.

A relamp indicator monitors the variable d.c. voltage and gives an indication when a relamp condition exists.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is noted, however, that the appended drawings illustrate only typical embodiments of the invention and are therefore not to be considered limiting in scope, for the invention may admit to other equally effective embodiments.

FIG. 1 is a block diagram representation of an automatic energy control system.

FIG. 2 is a block diagram of an embodiment of an automatically variable d.c. voltage source in accordance with the present invention.

FIG. 3 is a schematic diagram of an input network for use in the embodiment of the present invention.

FIG. 4 is a schematic diagram of a switch network for selecting the mode of operation of the variable d.c. voltage source.

FIG. 5 is a schematic diagram of another input network for use in the embodiment of the variable d.c. voltage source of the present invention.

FIG. 6 is a schematic diagram of a stable reference voltage source for use in the embodiment of the present invention.

FIG. 7 is a schematic diagram of a variable gain amplifier circuit for use in the embodiment of the present invention.

FIG. 8 is a schematic diagram of a photocell sensor for use in the embodiment of the present invention.

FIG. 9 is a schematic diagram of a differential amplifier for use in the variable d.c. source of the present invention.

FIG. 10 is a schematic diagram of a buffer circuit for use in the illustrated embodiment of the present invention.

FIG. 11 is a schematic diagram of an output network for use in the embodiment of the variable d.c. voltage source of the present invention.

FIG. 12 is a schematic diagram of a comparator circuit for use in the embodiment of the present invention.

FIG. 13 is a schematic diagram of a relaxation oscillator for use in the embodiment of the present invention.

DESCRIPTION OF THE PREFERRED EMBODIMENT

Figure 2A:
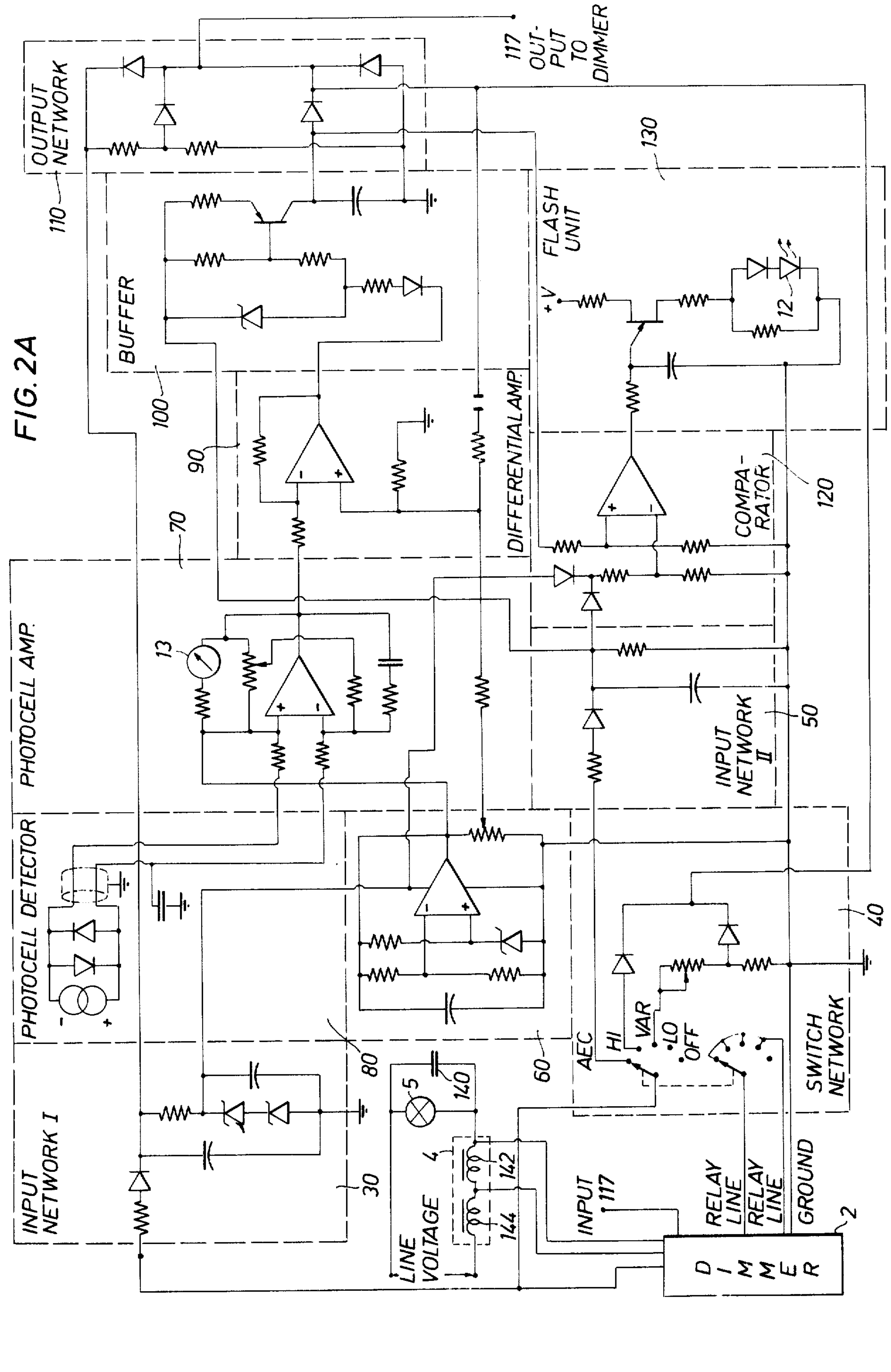
FIG. 2A is a schematic diagram of the complete circuitry for the embodiment illustrated in FIG. 2.

Referring now to the drawings wherein like reference numerals designate identical or corresponding parts throughout the several views, and more particularly to FIG. 1 thereof, there is shown an automatic energy control lighting system which includes an automatically variable d.c. voltage source 1 having a photocell 8, a dimmer circuit 2, and a fixture 3 having a ballast 4 and a lamp 5. Light from lamp 5 is dispersed over an area 7 to illuminate the same. A photocell 8 detects the level of illumination of area 7 and supplies a signal via cable 6 to the automatically variable d.c. voltage source 1. The automatically variable d.c. voltage source 1 connects to dimmer 2 which reacts to the d.c. voltage supplied by d.c. source 1. In response to the voltage, dimmer 2 operates to adjust the power to lamp 5 by controlling ballast 4. Details of the dimmer 2 and ballast 4 may be had by referring to the disclosure, particularly FIG. 1 and FIG. 8 thereof, of the issued patent entitled "High Intensity Lamp Dimming Circuit", previously incorporated by reference.

The system of FIG. 1 of the present application operates to maintain a constant level of illumination over area 7 during a period of time from initial installation to relamp. Photocell 8 monitors the illumination of area 7. If the level of illumination begins to fall slightly due to dirt and lumen depreciation, or any other light loss factor, the photocell 8 changes its output signal causing the automatically variable d.c. voltage source 1 to output a different d.c. voltage to dimmer 2. Dimmer 2 adjusts ballast 4 in the manner described in the referenced application so that more power is supplied to lamp 5. This automatic adjustment continues until the variable d.c. voltage source 1 is signalling for the ballast 4 to be placed at full output. When full output is reached, a relamp indication is given by variable d.c. voltage source 1.

FIG. 2

FIG. 2 is a block diagram of an embodiment of automatically variable d.c. voltage source 1. Variable d.c. voltage source 1 receives an input signal from dimmer 2. This input signal has a full wave rectified waveform that is produced by full wave rectifier bridge 64 in FIG. 1 of the referenced application. This input signal could be supplied from a separate source located within variable d.c. source 1. A switch network 40 provides for the selection of various modes of operation of the variable d.c. source 1 which further sets the mode of operation of the automatic energy control system and consequently the dimmer.

A stable reference signal source 60 produces a constant d.c. output signal representing the desired light level over area 7. Photocell circuit means 20 generates a signal in response to the illumination level over area 7. Operational amplifier means 90 produces a d.c. voltage functionally related to the amplitudes of the signals from the reference signal source 60 and the photocell circuit means 20. The d.c. output of operational amplifier means 90 varies as the signal from photocell amplifier 70 varies which is, of course, responsive to photocell 8 and the light level detected by it. The varying d.c. output of operational amplifier means 90 is applied to dimmer 2 after signal conditioning in buffer 100 subject to the mode set by switch network 40.

The conditioned d.c. output of buffer 100 along with a reference voltage is applied to a comparator circuit 120. The reference voltage supplied is a filtered waveform of the full wave rectified signal from dimmer 2. When the conditioned d.c. output of buffer 100 reaches the amplitude of the reference voltage, an indicator unit 130 is enabled which causes a light emitting diode (LED) 12 to begin flashing. Flashing of LED 12 represents a relamp time.

As well as the automatic mode just discussed, the automatically variable d.c. voltage source may be placed in the additional modes of "high", "low", "variable" and "off". As stated previously, these modes are selectable by switch network 40. In the "off" mode only, switch network 40 does not enable energization of main power line relay coils (not shown) thereby maintaining the lighting system turned off. In the other modes, fixed voltages or a manually variable voltage is placed at the output of the automatically variable d.c. voltage source 1. When being used in a mode other than "off", the variable d.c. voltage source 1 has utility as a light metering device. The meter 13 gives an indication of the light level being detected. These other modes will be discussed more fully in connection with the circuit diagrams which follow.

FIG. 2A is a schematic diagram of specific circuitry for implementing the block diagram of FIG. 2. Full description of the circuitry of the various blocks as well as component values will be given in connection with the discussion of the remaining figures.

FIG. 3

FIG. 3 illustrates in schematic form the circuitry of input network 30. The output voltage, approximately 33 volts peak, of bridge rectifier 64 of FIG. 8 of the referenced application is applied to terminal 29. The voltage forward biases diode 32 permitting current to flow charging up capacitor 33 to approximately the peak voltage (33 volts d.c.). Resistor 31 limits the charging rate of capacitor 33.

In parallel with capacitor 33 is a series combination of resistor 37 and zener diodes 34 and 35. Zener diodes 34 and 35 and resistor 37 limit the d.c. voltage at terminal 39 to a voltage lower than that at terminal 38. Capacitor 36 in combination with resistor 37 acts as a filter to smooth the voltage present at terminal 39. The voltage at terminal 39 serves as the power supply voltage for the various integrated circuits used.

Preferred values for the components of input network 30 are as follows:

| | | |
|---|---|---|
| resistor | 31 | 15 ohms, ¼w, 5% |
| resistor | 37 | 820 ohms, ¼w, 5% |
| capacitor | 33 | 25 microfarad, 50v |
| capacitor | 36 | 1 microfarad, 50v |
| diode | 32 | IN 4001 |
| diode | 34 | 13 volt zener |
| diode | 35 | 13 volt zener |

FIG. 4

FIG. 4 shows the schematic for the switch network 40. Switch network 40 has two rotary switches 41 and 42, each one having five positions. The selector contacts of the switches are connected together so that both switches may be set at the same time. The selector contact 49 of switch 42 is connected at terminal 29 to the rectified signal from bridge rectifier 64 of FIG. 8 in the referenced application. As the selector 49 of switch 42 is turned to the different positions, the rectified signal is applied to various component arrangements within switch network 40.

In the automatic energy control mode, switch network 40 passes the rectified signal to an output terminal 51 for subsequent use in other circuitry as will be explained later on herein. In the "high" mode, the rectified signal is switched to another path which contains diode 43. Diode 43 becomes forward biased and supplies the signal to the output terminal 53. In the "variable" mode, the rectified signal is supplied to a voltage divider comprising potentiometer 46 and 45. The voltage present at the anode of diode 44 forward biases diode 44 putting a voltage on output terminal 53. The voltage presented at terminal 53 may be varied while in the variable mode by adjusting potentiometer 46.

Note that diodes 43 and 44 are connected together and both supply output terminal 53. In the "high" mode, diode 44 blocks current flow preventing it from going to ground. The blocking by diode 44 maintains full rectified voltage on terminal 53.

Operation in the "low" mode does not have the voltage on selector contact 49 applied to any circuitry. Circuitry separate from the switch network 40 controls operation in this mode. Selector contact 49 is also unconnected in the "off" mode. Switch 41 has leads 48 and 47 open causing main power to the lighting system to be disconnected as the control relays (not shown) are not energized.

Preferred values for the components of switch network 40 are as follows:

| | | |
|---|---|---|
| potentiometer | 46 | 10,000 ohms |
| resistor | 45 | 8,200 ohms, ¼w, 5% |
| diode | 43 | IN 4001 |
| diode | 44 | IN 4001 |

FIG. 5

FIG. 5 illustrates circuitry for input network 50. Resistor 52 receives a signal from terminal 51 of switch network 40. Diode 54 is placed in series with resistor 52. When forward biased, diode 54 permits capacitor 56 to be charged at a rate determined by resistor 52 to approximately the peak voltage available from bridge rectifier 64 in dimmer 2. Resistor 58 is a bleeder resistor and discharges capacitor 56 if switch 42 (FIG. 4) is changed from the automatic energy control mode. Input network 50 supplies power at terminal 59 to buffer 100 and serves as a reference voltage input source for comparator 120. Input network 50 acts to filter and current limit the full wave rectified input signal from the bridge in dimmer 2.

Recommended component valves for input network 50 are as follows:

| | | |
|---|---|---|
| resistor | 52 | 15 ohms, ¼w, 5% |
| diode | 54 | IN 4001 |
| capacitor | 56 | 25 microfarad, 50v |
| resistor | 58 | 100,000 ohms, ¼w, 5% |

FIG. 6

FIG. 6 is a diagram of a stable reference voltage source 60. Reference voltage source 60 receives supply voltage at terminal 68. Terminal 68 connects to terminal 39 of input network 30 (FIG. 3). The supply voltage is applied to operational amplifier 66. Connected to operational amplifier 66 is a voltage divider made up of resistor 62 and resistor 63. Also connected to operational amplifier 66 is a second voltage divider circuit made up of resistor 64 and zener diode 65. The two voltage divider networks are connected in parallel. A capacitor 61 is placed across the output and serves to filter out noise and transient signals. The voltage at the output terminal 72 is determined by the relative values of resistors 62, 63 and zener diode 65. In the preferred embodiment, the voltage at terminal 72 is 8.4 volts. The output voltage can be determined by the expression:

$$\text{voltage out} = \frac{(\text{resistor } 62 + \text{resistor } 63)}{\text{resistor } 63} \times \text{zener voltage}$$

A potentiometer 10 provides the capability of putting a voltage from 0 volts to 8.4 volts on the terminal 11. Potentiometer 10 serves as the adjustment control for setting the desired light level over area 7.

The circuit components for reference voltage source 60 are preferably as follows:

| | | |
|---|---|---|
| resistor | 62 | 10,000 ohms, ¼w, 1% |
| resistor | 63 | 22,000 ohms, ¼w, 1% |
| resistor | 64 | 2,000 ohms, ¼w, 1% |
| zener diode | 65 | 5.6 volts |
| capacitor | 61 | 1 microfarad, 50v |
| potentiometer | 10 | 5,000 ohms |
| operational amplifier | 66 | LM 324, National Semiconductor |

FIG. 7 and FIG. 8

FIG. 7 and FIG. 8 illustrate circuitry for photocell detector 80 and photocell amplifier 70, which together form photocell circuit means 20. Photocell 8 is preferably a silicon photovoltaic cell which has a precision linear output in response to a light stimulus when its output leads are short circuited. Photocell 8 has diodes 83 and 84 across it to protect the photocell from damage should its output leads become open. Diodes 83 and 84 are connected such that the anode of one is at the cathode of the other. The lead extending from photocell 8 is a shielded cable 85 which has the shield 88 grounded to prevent noise spikes from masking out the signal from photocell 8. Capacitor 87 connects to the positive lead of the shielded cable 85 and to ground. A resistor 82 is placed in series with the positive lead of cable 85, and resistor 81 is placed in series with the negative lead of cable 85.

To insure a linear relationship between photocell current and illumination level, the photocell output must be short circuited, that is, whatever the photocell 8 is connected to must present an impedance as near to zero as possible. Photocell amplifier 70 offers a near zero input impedance and delivers an output voltage proportional to the current generated by photocell 8. Photocell amplifier 70 has an operational amplifier 73 to which the leads of shielded cable 85 connect. A feedback loop connects from the output 77 of amplifier 73 to the inverting input of the amplifier. The feedback loop is a voltage divider which consists of resistor 78 and potentiometer 9 with the wiper of potentiometer 9 connecting to the inverting input of amplifier 73 through resistor 74. A second loop from the output 77 to the inverting input contains a resistor 75 and a capacitor 76. A lead from reference voltage source 60 (FIG. 6) connects to the non-inverting input of amplifier 73 placing an initial potential on the input.

The output current of photocell 8 is filtered to remove high frequency interference and noise. This filtering is accomplished by capacitor 87 and resistor 81 and 82 in combination with the feedback network of capacitor 76 and resistor 75. The filtering further serves to improve the stability of the entire automatic energy control system by making the system immune to the highly rippled light output of HID lamps.

Potentiometer 9 is a sensitivity control which permits adjustment of the output voltage of photocell amplifier 70 for a given photocell current. This adjustment is an adjustment of the gain of photocell amplifier 70. The meter 13 in photocell amplifier 70 gives an indication of the illumination as detected by photocell 8.

Preferred component values for the photocell circuit 80 and the photocell amplifier 70 are as follows:

| | | |
|---|---|---|
| photocell | 8 | Vactec No. VTS-7070A |
| diode | 83 | 1N 4001 |
| diode | 83 | 1N 4001 |
| resistor | 81 | 47 ohms, ½w, 5% |
| resistor | 82 | 47 ohms, ¼w, 1% |
| capacitor | 87 | 10 nanofarad, 50v |
| resistor | 74 | 47,000 ohms, ½w, 1% |
| resistor | 75 | 2,200 ohms, ½w, 5% |
| capacitor | 76 | .15 microfarad, 80v |
| potentiometer | 9 | 5,000 ohms, 10 turn |
| resistor | 78 | 475 ohms, ¼w, 1% |
| resistor | 79 | 100,000 ohms, ¼w, 5% |
| meter | 13 | Micronta, 50 microampere |
| operational amplifier | 73 | LM 324, National Semiconductor |

FIG. 9

The operational amplifier means 90 is shown in FIG. 9 as a differential amplifier which senses and amplifies the difference between the adjusted voltage output of the stable reference voltage source 60 available from potentiometer 10, applied to terminal 11, and the voltage output of photocell amplifier 70, applied to terminal 98, which reflects changes in illumination levels. The differential amplifier 90 provides the necessary gain to amplify a detected change in illumination level, and thus initiate adjustment of lamp power to produce the lumen output necessary to provide the constant maintained illumination level.

The differential amplifier 90 utilizes an amplifier 91 in a differential amplifier configuration. The gain of the circuit is fixed by the ratio of the resistance value of resistor 92 to the resistance value of resistor 97. To make the source resistance equal for both the inverting and non-inverting inputs of amplifier 91, a resistor 96, which is equal resistance to resistor 97, and a resistor 95, which is of equal resistance to resistor 92, are used at the non-inverting input. Also connected to the non-inverting input terminal of amplifier 91 is a series combination of resistor 93 and capacitor 94 which serves to filter the output applied to terminal 53.

The output voltage at terminal 99 is a variable d.c. voltage which is equal to the difference between the reference voltage and the photocell amplifier output voltage multiplied by the gain of the circuit. Variations in light level are detected by photocell 8, and the signal produced is amplified by photocell amplifier 70. The amplified signal is supplied to the differential amplifier 90 and alters the difference value previously existing. The new difference is amplified and is applied to the lamp dimmer 2.

Recommended component values for the differential amplifier are as follows:

| | | |
|---|---|---|
| Amplifier | 91 | LM 324, National Semiconductor |
| resistor | 92 | 1 megaohm, ¼w, 1% |
| resistor | 97 | 22,000 ohms, ½w, 1% |
| resistor | 96 | 22,000 ohms, ½w, 1% |
| resistor | 95 | 1 megaohm, ½w, 1% |
| resistor | 93 | 22,000 ohms, ¼w, 5% |
| capacitor | 94 | .15 microfarad, 80v |

FIG. 10

A buffer 100 as illustrated in the schematic of FIG. 10 is coupled to the output of the differential amplifier 90 at terminal 99. Buffer 100 operates to translate the output voltage of the differential amplifier 90 to a higher power level capable of driving the dimmer 2 circuitry to produce full brightness of the lamp 5.

The buffer 100 is a transistor inverter; that is, it displays a decreasing voltage at its output in response to an increasing voltage at its input. The supply voltage to buffer 100 is from input network 50 (FIG. 5). Buffer 100 uses a pnp transistor 101 which can be driven to saturation. A resistor 102 is connected to the emitter, and a capacitor 103 is connected between the collector and ground potential. The output signal of buffer 100 is taken at terminal 108 tied to transistor 101. Resistor 109 connects the base of transistor 101 to the supply potential. Another resistor 104 connects to the base and to the anode of zener diode 105. Together, resistors 109 and 104 form a voltage divider network. The cathode of zener diode 105 is returned to the supply voltage. A resistor 106 also connects to the anode of the zener diode 105 and to the anode of a diode 107. The diode 107 serves as the input to buffer 100 providing signal isolation in a non-automatic energy control mode. The cathode of diode 107 is coupled to terminal 99 of the differential amplifier 90 of FIG. 9.

Buffer 100 is a voltage controlled current source in which the voltage at the cathode of diode 107 controls the conduction of transistor 101. If the voltage at terminal 99 is at the level of the supply voltage on terminal 59, transistor 101 is held cut-off. If the voltage at terminal 99 begins to decrease, a difference in potential exists between terminals 99 and 59. This voltage difference is distributed across the three resistors 109, 104 and 106 according to their values. The voltage drop across resistor 109 is equal to the base-emitter voltage plus the voltage drop across resistor 102. When the voltage at terminal 99 decreases to the level at which the voltage drop across resistors 104 and 109 equals the zener diode 105 voltage, the zener diode 105 takes over and fixes the voltage drop across the voltage divider formed by resistors 104 and 109 to a maximum. This has the effect of setting a maximum for the voltage drop across resistor 109. With the voltage across resistor 109 at a maximum level, the voltage across resistor 102 is also at a maximum. Therefore, the current through resistor 102 and the conduction of transistor 101 is fixed. Since transistor 101 is in or very near to saturation and resistor 102 is small, the voltage drop across the two components is very small (approximately 0.55 volts or less). Capacitor 103, in combination with the input impedance of dimmer 2, represents the impedance across which the output voltage is developed.

Variations in voltage at the cathode of diode 107 alter the flow of current through transistor 101 effecting a change in the voltage at terminal 108. The current source in buffer 100 in conjunction with capacitor 103 form an integrator which regulates the rate of change of the voltage. This is necessary to prevent sudden changes in photocell output due to passing clouds, sudden reflections or the like from causing rapid changes in applied lamp power.

The preferred component values for the buffer 100 are as follows:

| | | |
|---|---|---|
| transistor | 101 | MPS 4355 |
| resistor | 102 | 100 ohms, ¼w, 5% |
| resistor | 109 | 1,000 ohms, ¼w, 5% |
| resistor | 104 | 15,000 ohms, ¼w, 5% |
| resistor | 106 | 12,000 ohms, ¼w, 5% |
| diode | 107 | 1N 4001 |
| zener diode | 105 | 13 volt |
| capacitor | 103 | 250 microfarad, 50v |

FIG. 11

Output network 110 is shown in the schematic diagram of FIG. 11. Output network 110 receives voltage input signals from buffer 100 at terminal 108, switch network 40 at terminal 53, and input network 30 at terminal 118. These various voltage inputs provide the output voltage at terminal 117 depending upon the mode in which the automatic energy control system is to be operated.

Terminal 118 of output network 110 receives the input signal from input network 30 (FIG. 2A and FIG. 3). The signal at terminal 118 is applied to a voltage divider consisting of resistor 111 and resistor 112. The voltage across resistor 112 is applied to diode 113 which connects to output terminal 117. The voltage across resistor 112 is applied to output terminal 117 only in the event that the voltage is greater than that of the other two inputs, thereby forward biasing diode 113. This condition occurs when the automatic energy control system is switched to "low".

Also coupled to output terminal 117 is a lead from switch network 40. Specifically, terminal 117 is connected to terminal 53 (FIG. 4). This connection permits voltage to be at the output terminal 117 when the system is in either the "variable" or "night" mode.

The third input source, buffer 100, connects to diode 114 which then connects to output terminal 117. The voltage output across capacitor 103 of buffer 100 forward biases diode 114 provided the voltage at terminal 117 is of a lower potential and the system is in the "automatic" mode of operation.

A diode 116 is placed between output terminal 117 and ground as shown in FIG. 11. Also, a diode 115 is placed between terminal 117 and terminal 118 as shown. This arrangement is to protect the circuitry of the variable d.c. source 1 from excess voltages or currents introduced by external sources.

The recommended values for the circuit components are as follows:

| | | |
|---|---|---|
| resistor | 111 | 10,000 ohms, ¼w, 5% |
| resistor | 112 | 8,200 ohms, ¼w, 5% |
| diode | 113 | 1N 4001 |
| diode | 114 | 1N 4001 |
| diode | 115 | 1N 4001 |
| diode | 116 | 1N 4001 |

FIG. 12

The visual indicator of relamp time is LED 12. An indicator unit 130 in the form of a flasher is used to drive LED 12. Flasher unit 130 requires a positive enabling input voltage to operate. In addition, the source of the positive enabling input voltage must determine when relamp time occurs. The automatic energy control system has been designed such that relamping should take place when maximum power is being supplied to the lamp to provide the constant maintained illumination that is desired.

To provide the necessary input to flasher unit 130, the circuit of FIG. 12 is used. FIG. 12 shows the schematic for comparator 120. Comparator 120 uses an amplifier 121 having inverting and non-inverting inputs. The non-inverting input of amplifier 121 connects between resistors 122 and 123, which together form a voltage divider. The input to the voltage divider so formed is from terminal 108 of buffer 100 in FIG. 10.

A second voltage divider consisting of resistors 124 and 125 applies a voltage to the inverting input. The voltage applied to resistor 124 and thus to the voltage divider is from two possible sources. The primary source is input network 50. The voltage at terminal 59 of input network 50 is applied to terminal 128 of comparator 120. The voltage from input network 50 serves as a reference voltage to which the buffer output voltage is compared. When the buffer output voltage is at a level which would produce maximum lamp power as determined in relation to the reference voltage, the comparator 120 is caused to switch placing a positive voltage at its output. Before the output voltage of buffer 100 reaches the critical level, the output of comparator 120 is near zero volts. A diode 126 connects between terminal 128 and resistor 124 to provide a small voltage drop necessary to insure switching of comparator 120. Without this small, constant voltage drop, the buffer voltage could never reach the voltage level of the reference source.

The second source for the voltage divider (resistors 124 and 125) is that voltage present at terminal 39 of input network 30 (FIG. 3). This voltage is applied to resistor 124 by diode 127 via terminal 129 only when the system is in a mode other than "automatic". The application of this voltage to the voltage divider and thus to amplifier 121 is for the purpose of fixing the output voltage of comparator 120 at a level near zero volts when system operation is not automatic.

The preferred values for the components of comparator 120 are as follows:

| | | |
|---|---|---|
| diode | 126 | IN 4001 |
| diode | 127 | IN 4001 |
| amplifier | 121 | LM 324, National Semiconductor |
| resistor | 122 | 22,000 ohms, ¼w, 1% |
| resistor | 123 | 22,000 ohms, ¼w, 1% |
| resistor | 124 | 22,000 ohms, ¼w, 1% |
| resistor | 125 | 22,000 ohms, ¼w, 1% |

FIG. 13

FIG. 13 is the schematic diagram for the flasher unit 130. The flasher unit 130 goes into operation when a positive voltage of sufficient amplitude is applied to terminal 138 from the output of comparator 120. Flasher unit 130 is essentially a relaxation oscillator driving an LED 12. A unijunction transistor (UJT) 132 is used in the design with the input terminal of UJT 132 having an R-C timing circuit connected thereto. A resistor 137 and a capacitor 136 form the timing circuit. Resistor 131 connects a first base lead of UJT 132 to a supply voltage. In order for the flasher to operate, the voltage on terminal 138 must be greater than the peak voltage of UJT 132, which voltage is dependent upon supply voltage, resistor 131 and device characteristics. A resistor 133 connects between a second base lead of UJT 132 and a resistor 134 which in turn connects to ground. In parallel with resistor 134 is a series arrangement of diode 135 and LED 12.

The operation of UJT relaxation oscillators are well known to those skilled in the electronics art and will therefore not be discussed in detail.

The preferred values of the components used in the flasher of indicator unit 130 are as follows:

| | | |
|---|---|---|
| resistor | 131 | 2,200 ohms, ¼w, 5% |
| resistor | 133 | 100 ohms, ¼w, 5% |
| resistor | 134 | 220 ohms, ¼w, 5% |
| resistor | 137 | 27,000 ohms, ¼w, 5% |
| capacitor | 136 | 10 microfarad, 50v |
| diode | 135 | IN 4001 |
| LED | 12 | |
| UJT | 132 | 2N 2646 |

Referring once again to FIG. 2A, there is shown dimmer 2 connecting to ballast 4 of a lamp circuit. Ballast 4 includes two reactors 142 and 144 connected in series. Lamp 5 is in series with the ballast 4 and has a capacitor 140 across it.

It has been found that rapid or sudden dimming of the lamp from a level near maximum brightness tends to cause the lamp to extinguish. This may result when the variable d.c. source 1 (FIG. 2A) is switched from either the "AEC" or "high" mode to "low". In order to maintain stable lamp operation and to prevent the lamp from extinguishing, it has been found helpful to place a capacitor 140 across the lamp 5 as shown in FIG. 2A. For 250 watt, 400 watt and 1000 watt lamps, the capacitor should be about 1.2 microfarads.

During sudden lamp dimming, the lamp voltage has an initial tendency to rise almost instantaneously to a higher value than during higher brightness level operation. If the lamp voltage rises to or exceeds the value of the open circuit voltage, the current supplied to the lamp will not be sufficient to maintain an arc, and the lamp will extinguish. Also contributing to the lamp's tendency to extinguish is an advance of the phase of the lamp current and voltage. The capacitor counteracts both occurrences by providing a lagging phase shift and an increase in peak open circuit voltage.

After this transitory period, the lamp arc cools due to the low current through it. As the lamp cools, it will gradually stabilize at a lower lamp voltage, current and wattage. The stabilization of the lamp usually occurs in a matter of minutes. The capacitor affects lamp operation only during the rapid transition from a very bright lamp level to a dimmed condition. When the lamp is operating in a stabilized bright, intermediate or dim state, the capacitor has no appreciable affect upon lamp operation.

A capacitor across the lamp provides three principal advantages. First, a ballast with a lower open circuit voltage than previously used to achieve a given low wattage can be dimmed to the same low wattage. Secondly, it is possible to dim a lamp with a given ballast to a lower wattage than was previously achievable. Finally, a lamp may be dimmed at any speed.

OPERATION OF THE PREFERRED EMBODIMENT

Referring once again to FIG. 2A, there will now be discussed in detail the operation of the preferred embodiment which comprises the circuitry described in reference to the various figures. The automatically variable d.c. voltage source of FIG. 2A receives an input signal from dimmer 2 in the form of a full wave rectified signal. This signal serves not only as a synchronizing signal, but it also serves as the power source for the circuitry of the automatically variable d.c. voltage source. The full wave rectified signal is applied to input network 30 and to switch 42 of switch network 40. In the "automatic" mode, the signal is directed to input network 50. In the "high" mode, the voltage signal is applied to terminal 53 of switch network 40. In the "variable" mode, the voltage signal is applied to a voltage divider comprising a potentiometer 46 before being applied to terminal 53. A connection is made between terminal 53 in switch network 40 and terminal 117 of output network 110. In the "high" mode, the voltage signal is thus applied directly to the output of the variable d.c. voltage source. Potentiometer 46 of switch network 40 permits a manually controlled variable voltage to be supplied to terminal 117. In the "low" mode, the voltage at terminal 117 is supplied from input network 30. Terminal 118 is the input lead to a voltage divider which operates to produce a small voltage, selected by the values of the resistors 111, 112 of the voltage divider, at terminal 117.

Reference voltage source 60 provides a constant d.c. output voltage which remains precisely set. Potentiometer 10 is connected across the output of reference voltage source 60 permitting a variable, though stable, reference voltage which may be used to represent the desired light level over an area. Potentiometer 10 is the adjustment for setting the level of the illumination over the area that is desired to be maintained constant over a period of time by the automatic energy control system. The voltage selected by potentiometer 10 is applied to the non-inverting input of differential amplifier 90.

Photocell detector 80 and photocell amplifier 70 provide a second input signal to differential amplifier 90. As mentioned previously in regard to FIG. 8, photocell 8 is a silicon photovoltaic cell which has a linear relationship between the light incident upon it and the output current provided the photocell is short circuited. The amplifier circuit previously discussed in regard to FIG. 7 presents a near zero input impedance and delivers an output voltage proportional to the current generated by the photocell. Potentiometer 9 in the feedback loop of photocell amplifier 70 serves as the sensitivity adjustment for the voltage output of photocell amplifier 7. Potentiometer 9 operates to set a higher or a lower output voltage for a given photocell current. A meter 13 gives an indication of the light level present over an area. This indication is given no matter what mode is selected.

As the light level decreases, photocell 8 decreases in current output. In response to this change, the output of photocell amplifier 70 is driven more positive. The indication on meter 13 would show a decreasing deflection indicating a decrease in light level. If unchecked, the decrease in light level would continue over time.

Amplifier 91 of differential amplifier 90 operates to output a voltage which is determined by the difference between the input voltages multiplied by the gain as determined by resistors 92, 95, 96 and 97 of the differential amplifier. Therefore, as the voltage at the output of photocell amplifier 70 increases, the output voltage available from amplifier 91 decreases. It is apparent therefore, that a variable d.c. voltage is available from differential amplifier 90 in response to the light level over an area as detected by photocell 8. Further, the output voltage of differential amplifier 90 represents the relationship between the actual light level and the desired light level.

Buffer 100 senses the voltage variations at the output of differential amplifier 90. Buffer 100 operates as an inverter, and as the output voltage from differential amplifier 90 decreases in the manner discussed, buffer 100 provides an increasing voltage at its output terminal 108. In effect, buffer 100 is the control mechanism by which a low level signal available from differential amplifier 90 controls a higher level signal. Electrical power is supplied to buffer 100 from input network 50. The voltage supplied is a filtered form of the full wave rectified voltage signal from dimmer 2 supplied in switch network 40 to input network 50. As the voltage at the output of differential amplifier 90 decreases in response to a decreasing light level, transistor 101 of buffer 100 is driven further into conduction drawing more current from input network 50 and producing a more positive voltage at output terminal 108. This voltage is applied to output network 110 and subsequently to dimmer 2. With the increased voltage applied, dimmer 2 increases the power to the lamp that it is controlling resulting in an increase in light level.

Correction of lamp light output is performed on a continuing basis providing for instantaneous adjustment of lamp power. Buffer 100 smoothes the response of the control system by providing the necessary critical damping to render it stable and to prevent oscillations which would result in fluctuations in light output from the lamps being controlled.

The foregoing description of the invention has been directed to a particular preferred embodiment in accordance with the requirements of the Patent Statute and for purposes of explanation and illustration. It will be apparent, however, to those skilled in this art that many modifications and changes may be made without departing from the scope and spirit of the invention. For example, the circuitry shown for the various blocks may be altered and other types of circuitry used. The circuitry shown for the reference signal source 60 and the photocell amplifier 70 could be current sources rather than voltage sources. Also with appropriate modifications, operational amplifier circuit 90 could be a summing amplifier rather than a differential amplifier. Implementation of both circuitry variations is within the ability of those having ordinary skill in the art.

It will be further apparent that the invention may also be utilized, with suitable modifications, in other applications wherein an adjustably variable d.c. voltage is required in response to light variations. For example, the variable d.c. voltage source 1 could operate as a light level detection alarm in a work area. In such an application, the variable d.c. source 1 would not connect to a control ballast. A second reference voltage representing an alarm condition would be introduced to the comparator 120. As the light level reached a point sufficiently above or below the desired level, depending upon the particular circumstances of the application, a voltage would be produced which upon reaching or exceeding the reference voltage would cause the indicator unit 130 to signal an alarm.

These, and other modifications of the invention will be apparent to those skilled in this art. It is the applicant's intention in the following claims to cover all such equivalent modifications and variations as fall within the true spirit and scope of the invention.

What is claimed is:

1. In combination with a high intensity gas discharge lamp, a dimmer circuit for controlling the brightness thereof comprising:

ballast means connected to the lamp and connectable to an ac power distribution line;

said ballast means including a reactor portion;

gated bypass means for providing at least partial bypass of current around said reactor portion of said ballast means;

controllable gate source voltage means operably connected to said gated bypass means for controllably rendering said gated bypass means conductive, and thereby bypassing said reactor portion of said ballast means; and a capacitor connected across the lamp to prevent extinguishing of the lamp during rapid and sudden dimming.

2. An automatic energy control lighting system for maintaining substantially constant illumination over a work area with time, comprising:

one or more lamps for projecting light over a work area;

an electrical signal source generating a bias signal that is automatically variable in response to changes in the total illumination level over the work area as detected by a photocell circuit;

a buffer circuit to convert the variable bias signal to a higher signal level, said buffer circuit having means for regulating the rate of change of the higher level signal to provide a system to prevent rapid changes thereof in response to transient ambient stimuli; and power control means for adjusting the power supplied to said lamps in response to the higher level signal to alter the light output of said lamps to maintain substantially constant illumination of the work area over time.

3. The apparatus of claim 2, further comprising:

indicator means for monitoring the voltage supplied to said power control means to provide an indication of a relamp condition.

4. The apparatus of claim 3, wherein said indicator means includes:

comparator means for comparing the voltage supplied to said power control means with a reference voltage, said comparator providing an output signal when the voltage to said power control means reaches the level prescribed by the reference voltage; and oscillator means responsive to the output signal from said comparator means for driving a light source indicator.

5. The apparatus of claim 2, further comprising:

an output network coupled to a plurality of voltage inputs, including said buffer circuit, said network serving to apply a selected voltage input to said power control means; and a switch network for selecting a desired voltage input to be received by said output network and to be applied to said power control means.

6. The apparatus of claim 5, further comprising:

indicator means for monitoring the converted signal from said buffer means to provide an indication of a relamp condition.

7. The apparatus of claim 2, wherein said power control means is a dimmer circuit suitable for controlling the brightness of a high intensity discharge lamp.

8. The apparatus of claim 2, further comprising:

a capacitor connectable across each lamp to prevent extinguishing of the lamp during rapid and sudden dimming.

9. The apparatus of claim 2 wherein said electrical signal source comprises:

a reference signal source producing a stable electrical signal representative of a desired illumination level to be maintained over the work area;

a photocell circuit for monitoring the total illumination level over the work area; and amplifier means connected to said reference signal source and said photocell circuit for producing said variable bias signal, which bias signal is functionally related to the difference between the existing illumination level over the work area and the desired illumination level.

10. The apparatus of claim 9, wherein the variable bias signal from said amplifier means is a variable d.c. voltage.

11. The apparatus of claim 9, wherein said amplifier means is a differential amplifier.

12. The apparatus of claim 9, wherein said photocell circuit comprises:

a photovoltaic cell providing an output current which varies linearly with light incident upon it; and an amplifier connected to said photovoltaic cell presenting an input impedance which approximates a short circuit.

13. The apparatus of claim 9, wherein said reference signal source includes an amplifier providing a constant voltage determined by a voltage divider network and a voltage regulator network coupled to separate inputs of the amplifier.

14. An automatically variable d.c. voltage source suitable for use with a lamp dimmer circuit that adjusts the light output of a lamp illuminating a work area in response to a variable d.c. bias, comprising:

a reference signal source producing a stable, continuous electrical signal level representative of a level of illumination desired over a work area;

photocell circuit means for detecting the level of illumination produced by a light source over a work area and producing a variable level signal representative of the level of illumination over the work area;

amplifier means connected to said reference signal source and said photocell circuit means for automatically producing a variable d.c. bias signal functionally related to the difference between the level of illumination over the work area and the desired illumination level for the work area; and a buffer circuit to convert said variable d.c. bias signal to a higher signal level, said buffer comprising a controlled current source having a capacitor at its output to form an integrator that regulates the rate of change of the higher level d.c. bias signal to prevent rapid changes thereof in response to transient ambient stimuli.

15. The apparatus of claim 14, wherein said photocell circuit means comprises:

a photovoltaic cell providing an output current which varies linearly with light incident upon it; and an amplifier connected to said photovoltaic cell presenting an input impedance which is approximately zero; and wherein said amplifier means is a differential amplifier producing a variable d.c. voltage.

16. The apparatus of claim 14, further comprising:

indicator means for monitoring the signal produced by said amplifier means to provide an output signal when the signal from said amplifier means reaches a prescribed level.

17. The apparatus of claim 16, wherein said indicator means comprises a reference voltage source and a voltage comparator which produces the output signal.

18. The apparatus of claim 15, further comprising:

indicator means for monitoring the d.c. voltage produced by said differential amplifier to provide an output signal when the d.c. voltage reaches a prescribed level;

said indicator means comprising a reference voltage input means and a voltage comparator connected to said reference voltage input means and said differential amplifier; said voltage comparator producing the output signal.

19. The apparatus of claim 18, further comprising:

an output network coupled to said differential amplifier; and a switch network connected to said output network and said differential amplifier for selecting a desired output signal level to be available from said output network.

20. The apparatus of claim 19, wherein said output network includes an output lead, a first diode connecting the output lead to the positive supply potential, and a second diode connecting the output lead to the negative supply potential; said diodes serving as protection devices for the circuitry connecting to said output network.

21. The apparatus of claim 18, wherein said indicator means includes a flasher unit having a relaxation oscillator; said flasher unit comprising:

a unijunction transistor;

a light emitting diode;

a first resistor connecting the cathode of said light emitting diode to said unijunction transistor; and a second resistor in parallel with said light emitting diode for conducting leakage current through said unijunction transistor to ground.

22. The apparatus of claim 15, further comprising a pair of diodes connected in parallel with said photovoltaic cell; said pair of diodes being connected with the anode of each diode coupled to the cathode of the other.

* * * * *